Nov. 3, 1959   H. G. McCARTY ET AL   2,910,816
HITCHING DEVICE
Filed March 4, 1958
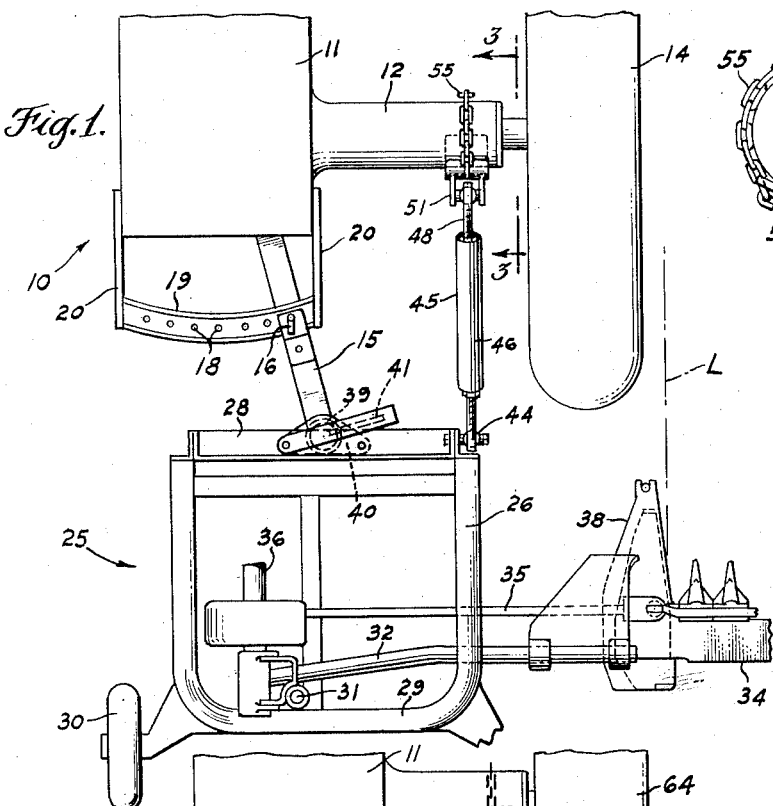
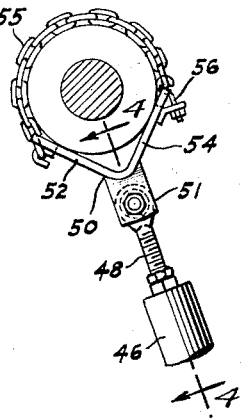
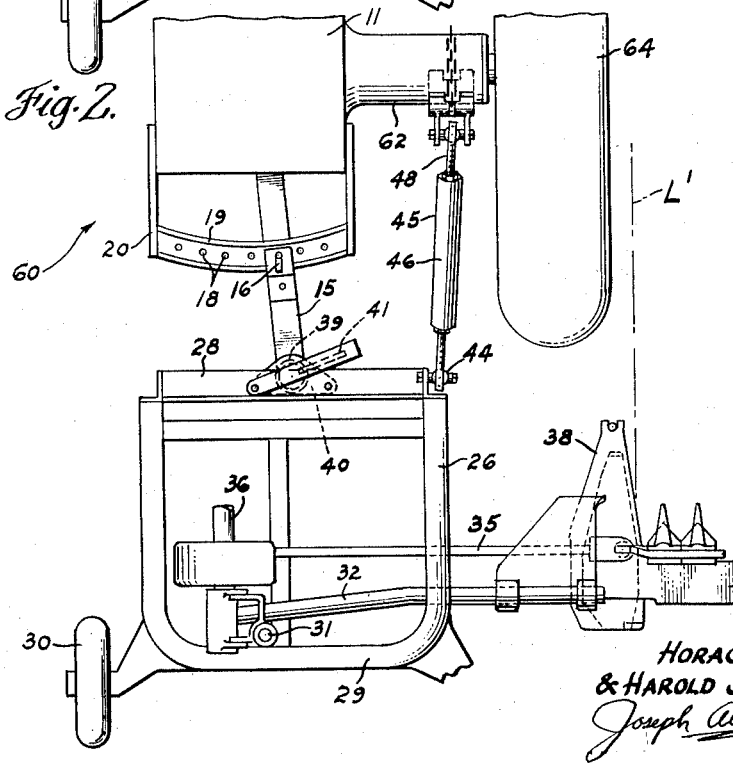
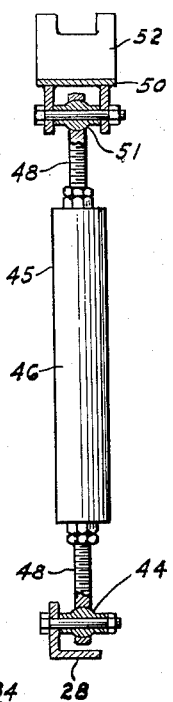
INVENTORS
HORACE G. McCARTY
& HAROLD J. BRIKOWSKI
Joseph Allen Brown
ATTORNEY

United States Patent Office 2,910,816
Patented Nov. 3, 1959

2,910,816

HITCHING DEVICE

Horace G. McCarty, New Holland, Pa., and Harold J. Brikowski, Denver, Colo., assignors to Sperry Rand Corporation, New Holland, Pa., a corporation of Delaware Application March 4, 1958, Serial No. 719,160

4 Claims. (Cl. 56—25)

This invention relates generally to farm equipment, and more particularly to a device for hitching an implement to a tractor. Still more specifically, the invention relates to the hitching of a semi-mounted implement to a tractor wherein a crop engaging portion of the implement projects laterally of the tractor and should be disposed in a given lateral position relative to the tractor for proper operation.

Tractors for farm use come in various sizes and designs. The problem of hitching semi-mounted implements to them is of considerable magnitude because of the wide variety of tractors to be considered. Heretofore, it has been the practice to provide various adapters for a given semi-mounted implement whereby a farmer could pick the adapter suitable for connecting the implement to his particular tractor. The necessity for having to provide a plurality of adapters for one implement possesses many obvious drawbacks.

The primary object of this invention is to provide a single device which may be used in hitching a semi-mounted implement to a plurality of sizes of tractors.

Another object of this invention is to provide a device of the character described whereby the semi-mounted implement with which it is associated may be quickly and easily hitched to the tractor and properly positioned relative thereto.

A further object of this invention is to provide a device of the character described which is simply constructed and has few parts.

Other objects of this invention will be apparent hereinafter from the specification and from the recital in the appended claims.

In the drawing:

Fig. 1 is a fragmentary plan view of a tractor and a semi-mounted implement, the implement being hitched to a tractor by a device constructed according to this invention;

Fig. 2 is a plan view similar to Fig. 1 showing the same implement and hitching device associated with a different tractor;

Fig. 3 is an enlarged section taken on the line 3—3 of Fig. 1 and looking in the direction of the arrows; and Fig. 4 is a section taken on the line 4—4 of Fig. 3 and looking in the direction of the arrows, parts of the strut structure employed being added.

In accomplishing the objects of this invention, it has been taken into account that all tractors have a rear axle, that the lengths of the axles will vary from tractor to tractor, that tractors have a rearwardly extending laterally swingable drawbar to which one end of an implement may be connected, and that the distance from the outer end of the drawbar to the rear axle will vary from one tractor to another.

Referring now to the drawing and particularly to Fig. 1, 10 denotes a conventional T-shaped tractor having a body 11, a rear axle section 12 and a ground wheel 14. The other section of the rear axle and the other ground wheel are not shown.

Pivotally connected to the body 11 of the tractor and extending rearwardly thereof is a drawbar 15. Drawbar 15 is laterally swingable relative to the rear end of the tractor, being adapted to be locked in adjusted position by a pin 16 projectable through a selected hole 18 in an arcuate bar 19. Bar 19 is supported on arms 20 extending rearwardly from body 11. The outer end of the drawbar has a bolt hole, not shown.

Disposed rearwardly of tractor 10, is a semi-mounted implement 25 comprising a rectangular frame 26 having a front end 28 and a rear end 29. Rear end 29 is supported on a pair of ground wheels 30, one of which is shown. Pivotally connected to frame 26 at 31 is a support arm 32 which carries crop engaging means 34, in the form of a mower. The mower extends transversely relative to the direction of travel of the tractor and laterally to one side thereof, that is, outwardly of the adjacent tractor wheel 14. It is driven by a pitman 35 reciprocated by power delivered through input shaft 36 driven from a connection, not shown, to the tractor.

The mower has an inner shoe 38 which is preferably positionable so that the inner end of the mower cuts within a few inches of the line of travel of the wheel 14, as indicated by dot dash line L.

Connected to the outer end of drawbar 15 is a first element of a universal joint, namely a ball element 39. The front end 28 of frame 26 carries a second universal element, namely a socket 40 adapted to fit over the ball. The front of the frame 26 is supported by the tractor drawbar for universal movement relative thereto. The connection between the universal elements is such that the socket 40 readily fits over ball 39. When traveling over rough terrain, a sudden jolt might cause the front end of the frame 26 to jump off the ball 39. Thus, means is provided to hold the socket 40 on the ball. Such means comprises a spring biased pin 41 carried on socket 40 and engageable with the lower portion of ball 39. In all respects, the ball and socket connection is of a conventional, well-known type, as shown for example in U.S. Patent No. 2,793,879 issued May 28, 1957.

Universally connected to frame 26 at 44, laterally spaced from the drawbar toward the mower, is an extendable strut 45 comprising (Fig. 4) a tubular body 46 into the opposite ends of which are threaded rods 48. Strut 45 extends forwardly from frame 26 having a V-shaped bracket 50 universally connected to it at 51. The legs 52 and 54 of bracket 50 form a pocket adapted to receive rear axle 12, the legs more or less straddling the axle. Suitably connected to the extremity of leg 52 is a chain 55 (Fig. 3) adapted to be wrapped around axle 12 and then connected to the other leg 54. Any suitable means such as that shown at 56 may be employed in securing the free end of the chain to the leg 54. The rotating of body 46 operates like a turn-buckle to vary the length of the strut.

In operation, when an operator wishes to connect implement 25 to tractor 10, he bolts the ball element 39 to the drawbar 15. Then he jacks up the front end 28 of frame 26, using a jack, not shown. Front end 28 is jacked up high enough so that the drawbar 15 and ball element 39 may pass under the socket 40. After frame 26 has been jacked up, the tractor is backed toward the implement, the operator maneuvering the tractor so that wheel 14 is properly disposed relative to the imaginary line L. The drawbar 15 is laterally positioned so that the ball element will come into register with socket 40. When the tractor and drawbar are properly disposed, the drawbar is locked in place by pin 16 projected through the appropriate hole 18, and the front of frame 26 is lowered onto the drawbar. Then the length of strut 45 is adjusted by rotating body 46, the strut being of proper length when the bracket 50 abuts against the axle 12.

When the bracket 50 is against the axle, the chain 55 is passed around the axle and connected by the means 56 to the leg 54 whereby the forward end of the strut is connected to axle 12.

Since the connection of the frame 26 with the drawbar 15 is universal, and since the respective connections of the strut 45 to the implement frame and tractor axle are also universal, relative shifting of the various parts is permitted when the implement is operated in the field.

Fig. 2 shows applicants' hitching device applied to a different tractor. Numerals the same as those employed in Fig. 1, indicate like parts. The tractor denoted 60, has an axle section 62 and ground wheel 64. Axle section 62 is of shorter length than the axle section 12 shown in Fig. 1. To properly position the crop engaging means 34 so that the inboard cutting line L' is proper relative to wheel 64, it is necessary that drawbar 15 be adjusted to a different lateral position than that shown in Fig. 1. When in proper position pin 16 locks it in place.

In Fig. 2 the length of the drawbar is the same as that shown in Fig. 1. Thus, the length of the strut is essentially the same. However, the drawbar might be longer or shorter in which event strut 45 would have to be adjusted as to length to provide a proper extension between the implement and tractor rear axle.

Although bracket 50 may be readily detached from the tractor axle, the operator, if he so desires, may leave bracket 50 permanently connected to the tractor axle, disconnecting the implement from the axle at the universal connection 51 when the implement is unhitched.

With the hitching device just described, the semi-mounted implement 25 can be readily connected to a plurality of sizes and types of tractors without a special adapter being required for each tractor. Further, while the hitch has great versatility it is of simple construction, has few parts and can be manufactured at low cost. Moreover, once a hitching has been accomplished the "lead" of the crop engaging means can be quickly and easily varied. By "lead" is meant the angle of projection of the crop engaging means, it being desirable to have the outer end of such means slightly ahead of the inner end.

While this invention has been described in connection with one embodiment and two adaptations thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

Having thus described our invention, what we claim is:

1. A device for hitching a trail-behind, semi-mounted implement to a tractor, wherein the implement has crop engaging means extending transversely relative to the direction of travel of the tractor and laterally to one side thereof, a rigid frame supporting said crop engaging means, said frame being disposed behind said tractor and having a rear end and a front end, and wheel means supporting said rear end, said tractor having a rear axle, a ground wheel at the end of the axle adjacent said crop engaging means, a rearwardly extending laterally adjustable drawbar, and means locking said drawbar in laterally adjusted position, said hitching device comprising a first element of a universal joint connectable to said drawbar, a second element of a universal joint carried on said front end of said frame, said second element being connectable to said first element whereby said frame front end is supported by said drawbar for universal movement, a strut, means universally connecting one end of said strut to said front end of said frame at a point laterally spaced toward said crop engaging means from the connection of said front end to said drawbar, means detachably and universally connecting the opposite end of said strut to said rear axle adjacent said ground wheel, and means forming part of said strut for varying the length of the strut whereby it can be adjusted in accordance with the distance from said implement front end to said rear axle.

2. A device for hitching a trail-behind semi-mounted implement to a tractor, wherein the implement has crop engaging means extending transversely relative to the direction of travel of the tractor and laterally to one side thereof, a rigid frame supporting said crop engaging means, said frame being disposed behind said tractor and having a rear end and a front end, and wheel means supporting said rear end, said tractor having a rear axle, a ground wheel at the end of the axle adjacent said crop engaging means, a rearwardly extending laterally adjustable drawbar, and means locking said drawbar in laterally adjusted position, said hitching device comprising a first element of a universal joint connectable to said drawbar, a second element of a universal joint carried on said front end of said frame, said second element being connectable to said first element whereby said frame front end is supported by said drawbar for universal movement, a strut, means universally connecting one end of said strut to said front end of said frame at a point laterally spaced toward said crop engaging means from the connection of said front end to said drawbar, a bracket, means universally connecting said bracket to the opposite end of said strut, said bracket having a pair of legs defining a pocket adapted to receive a portion of said tractor rear axle, means detachably connecting said bracket to said rear axle, and means forming part of said strut for varying the length of the strut whereby it can be adjusted in accordance with the distance from said implement front end to said rear axle.

3. A device for hitching a trail-behind, semi-mounted implement to a tractor wherein the implement has crop engaging means extending transversely relative to the direction of travel of the tractor and laterally to one side thereof, a rigid frame supporting said crop engaging means, said frame being disposed behind said tractor and having a rear end and a front end, and wheel means supporting said rear end, said tractor having a rear axle, a ground wheel at the end of the axle adjacent said crop engaging means, a rearwardly extending laterally adjustable drawbar, and means locking said drawbar in laterally adjusted position, said hitching device comprising a first element of a universal joint connectable to said drawbar, a second element of a universal joint carried on said front end of said frame, said second element being connectable to said first element whereby said frame front end is supported by said drawbar for universal movement, a strut, means universally connecting one end of said strut to said front end of said frame at a point laterally spaced toward said crop engaging means from the connection of said front end to said drawbar, a bracket, means universally connecting said bracket to the opposite end of said strut, said bracket having a pair of legs defining a pocket adapted to receive a portion of said tractor rear axle, a flexible member having one end connected to one of said pair of legs and passable around said rear axle to the other leg, means detachably connecting the other end of said flexible member to said other leg, and threadable means forming part of said strut for varying the length of the strut whereby it can be adjusted in accordance with the distance from said implement front end to said rear axle.

4. A device for hitching a trail-behind, semi-mounted implement to a tractor wherein the implement has crop engaging means extending transversely relative to the direction of travel of the tractor and laterally to one side thereof, a rigid frame supporting said crop engaging means, said frame being disposed behind said tractor and having a rear end and a front end, and wheel means supporting said rear end, said tractor having a rear axle, a ground wheel at the end of the axle adjacent said crop engaging means, a rearwardly extending laterally adjustable drawbar, and means locking said drawbar in laterally adjusted position, said hitching device comprising a ball element of a universal joint connectable to said drawbar, a socket element of a universal joint carried on said front end of said frame, said socket element being mounted on said ball element whereby said frame front end is supported by said drawbar for universal movement, a strut, means universally connecting one end of said strut to said front end of said frame at a point laterally spaced toward said crop engaging means from the connection of said front end to said drawbar, a bracket, means universally connecting said bracket to the opposite end of said strut, said bracket having a pair of legs defining a pocket adapted to receive a portion of said tractor rear axle, a chain having one end connected to one of said pair of legs and passable around said rear axle to the other leg, means detachably connecting the other end of said chain to said other leg, and threadable means forming part of said strut for varying the length of the strut whereby it can be adjusted in accordance with the distance from said implement front end to said rear axle.

References Cited in the file of this patent
UNITED STATES PATENTS

| | | |
|---|---|---|
| 2,065,015 | Nielsen | Dec. 22, 1936 |
| 2,505,445 | Walling | Apr. 25, 1950 |
| 2,596,902 | Krause | May 13, 1952 |
| 2,817,204 | Heinlein et al. | Dec. 24, 1957 |